2,748,935

PROCESS FOR SEPARATING TALC AND ASBESTOS

Karl Rescheneder, Vocklabruck, Austria, assignor to Eternit-Werke Ludwig Hatschek, Vocklabruck, Austria, a corporation of Austria No Drawing. Application September 17, 1951, Serial No. 247,026

Claims priority, application Austria September 29, 1950

4 Claims. (Cl. 209—5)

This invention relates to a process for separating talc and asbestos.

Numerous types of asbestos, mainly of Canadian origin, still contain a varying quantity of talc even after mechanical purification and treatment with hot water or steam. This talc content of the asbestos fibre is disadvantageous in some branches of the asbestos-working industry. For example, the smoothness due to the presence of talc causes considerable technical difficulties in the spinning of the fibres. Although these difficulties can be substantially overcome, it is obvious that the final product would have better properties without the talc adhering to the fibre.

In the production of asbestos-containing artificial stone of all kinds, it has only been partially possible to overcome the difficulties caused by the talc present on the fibre, since it acts as a lubricant and therefore reduces the reinforcing action of the fibre. Hitherto, this difficulty has been countered by employing mixtures of talc-free asbestos and talc-containing asbestos in proportions varying in accordance with the requirements. Earlier experiments in removing talc from asbestos before it is worked up have been unsuccessful.

In accordance with the present invention, the aforesaid disadvantages are effectively overcome by treating the talc-containing asbestos with a solution of a colloid or surface-active substance, it having been surprisingly found that talc loses its adhering power on the asbestos fibres in solutions of such substances and separates (in addition to asbestos dust and serpentine dust) therefrom when the asbestos-talc-mixture is washed or elutriated with such solutions. The talc remains suspended in the solution. By this simple means, it is possible to impart to talc-containing asbestos, properties which are very valuable in talc-free asbestos. As is well known, surface-active substances include on the one hand substances which have the property of reducing the surface tension of the liquid in which they are dissolved. On the other hand, the expression "surface-active substances" includes substances which are adsorbed on a boundary surface and also reduce the surface tension of the liquid by forming hydrophilic precipitates, so that these substances promote the wetting of the talc. For example, colloidal solutions of alkali silicates, casein or albumin may be employed. Silicic acid and casein are precipitated from a water glass solution or an alkaline casein solution on the talc and asbestos, whereby the talc is rendered capable of being wetted. The same happens if talc-containing asbestos is treated with solutions of substances which enter into a weak reaction with asbestos and/or talc to form adsorbable reaction products. Thus, aluminium chloride ($AlCl_3$) forms with the asbestos small quantities of aluminium hydroxide ($Al(OH)_3$) which are adsorbed and render the talc capable of being wetted. Furthermore, the same effect has also been observed in the treatment of talc-containing asbestos with solutions of substantive dyes, for example alizarin red, which also have the property of being adsorbed on a boundary surface.

The action of the substances employed in accordance with the invention is explained by the following simple experiment: If talc is strewn on pure water and the water is stirred, distribution of the talc in the water is practically impossible. However, if solutions of substances of the type specified are mixed with the water, a milky turbidity which persists for a long time is produced upon stirring.

In principle, it is immaterial to the production of the desired effect whether the substances of the aforesaid type are brought into solution before, during or after the emulsification of the asbestos. It is also possible to mix the said substances in dry or moist form with the talc-containing asbestos and to dissolve them simultaneously with the distribution of the asbestos in the solution. The methods employed for this purpose, such as mixing in edge mills, in an agitating mechanism or in a hollander or the like are known per se. The talc suspended in the solution can be separated from the fibre by any desired means, such as sieves, and the asbestos can then be obtained in completely pure form by washing.

However, in some cases such a separation of the talc suspension from the fibre is not essential. As already stated, talc is harmful in artificial stone of all kinds which contains fibres, principally because it acts as a lubricant between the fibre and the binding agent. However, small quantities of talc distributed in the binding agent have no harmful effect. The suspension of certain quantities of talc in the water employed for the production of asbestos-containing artificial stone, for example asbestos cement, can therefore be tolerated in certain cases.

The quantity of colloidal or surface-active substance required to free asbestos from the talc depends upon the nature and origin of the asbestos, and upon the talc content thereof, but this quantity is in all cases very small. For removing talc from Canadian asbestos, for example, a 0.2 per cent alkaline casein solution is sufficient. The same effect is obtained by a solution of alizarin red containing 0.5 per thousand of alizarin red calculated on the weight of asbestos, or by an aluminium chloride solution containing 0.5 per cent to 1 per cent of $AlCl_3$, calculated on the weight of the asbestos.

The process described for the treatment of asbestos may also be employed as a method of analysis, since the talc content of an asbestos can be very accurately determined thereby. The necessary quantity of colloid or surface-active substance will then be determined from the result of such analysis.

What I claim is:

1. A process for separating talc from asbestos fibres having small amounts of talc admixed therewith comprising treating said asbestos with a non-acidic colloidal solution of a surface active substance selected from the group capable of forming hydrophilic precipitates on the boundary surfaces thereby rendering the talc capable of being wetted.

2. A process for separating talc from asbestos having small amounts of talc admixed therewith comprising treating said asbestos with a solution selected from the group consisting of a solution of an alkali silicate and an alkaline solution of casein, thereby forming a suspension of talc in said solution.

3. A process for separating talc from asbestos having small amounts of talc admixed therewith comprising treating said asbestos with a solution of an alkali silicate, thereby forming a suspension of talc in said solution.

4. A process for separating talc from asbestos having small amounts of talc admixed therewith comprising treating said asbestos with an alkaline solution of casein, thereby forming a suspension of talc in said solution.

(References on following page)

References Cited in the file of this patent

UNITED STATES PATENTS

| | | |
|---|---|---|
| 1,446,378 | Borcherdt | Feb. 20, 1923 |
| 1,737,716 | Handy | Dec. 3, 1929 |
| 1,907,616 | Tucker | May 9, 1933 |
| 2,626,213 | Novak | Jan. 20, 1953 |

FOREIGN PATENTS

| | | |
|---|---|---|
| 6148/1908 | Great Britain | June 21, 1909 |

OTHER REFERENCES

Chemical Abstracts 39, 3666.

Soaps & Proteins, Their Colloid Chemistry in Theory & Practice by Fischer et al., (c) 1921 by John Wiley & Sons, pp. 6 and 7. (Copy in Scientific Library.)